United States Patent [19]
Joseph et al.

[11] Patent Number: 5,959,775
[45] Date of Patent: Sep. 28, 1999

[54] URETHANE/ACRYLATE BEAD BOND FOR RETROREFLECTIVE ARTICLES

[75] Inventors: William D. Joseph, River Falls, Wis.; Lee A. Pavelka, Cottage Grove, Minn.

[73] Assignee: 3M Innovative Properties Company, St. Paul, Minn.

[21] Appl. No.: 08/996,950

[22] Filed: Dec. 23, 1997

[51] Int. Cl.$^6$ .................................................. G02B 5/128
[52] U.S. Cl. ...................... 359/538; 359/536; 359/539; 359/540; 359/541
[58] Field of Search ..................... 359/515, 529, 359/530, 534–536, 538–542, 546; 428/203, 204, 423.1, 423.7, 460, 480, 482, 913, 412

[56] References Cited

U.S. PATENT DOCUMENTS

| | | |
|---|---|---|
| 1,175,224 | 3/1916 | Bleeker . |
| 2,407,680 | 9/1946 | Palmquist et al. . |
| 2,461,011 | 2/1949 | Taylor et al. .................. 49/77 |
| 2,726,161 | 12/1955 | Beck et al. .................. 106/47 |
| 2,842,446 | 7/1958 | Beck et al. .................. 106/47 |
| 2,853,393 | 9/1958 | Beck et al. .................. 106/47 |
| 2,870,030 | 1/1959 | Stradley et al. ............ 106/47 |
| 2,939,797 | 6/1960 | Rindone ..................... 106/47 |
| 2,965,921 | 12/1960 | Bland ........................ 18/2.5 |
| 2,992,122 | 7/1961 | Beck et al. .................. 106/53 |
| 3,190,178 | 6/1965 | McKenzie . |
| 3,468,681 | 9/1969 | Jaupain ..................... 106/47 |
| 3,700,305 | 10/1972 | Bingham . |
| 3,946,130 | 3/1976 | Tung et al. ............... 428/325 |
| 4,025,159 | 5/1977 | McGrath . |
| 4,192,576 | 3/1980 | Tung et al. . |
| 4,367,919 | 1/1983 | Tung et al. . |
| 4,495,061 | 1/1985 | Mayer et al. ............. 208/89 |
| 4,564,556 | 1/1986 | Lange ..................... 428/325 |
| 4,653,854 | 3/1987 | Miyata . |
| 4,663,213 | 5/1987 | Bailey et al. ............. 428/204 |
| 4,721,649 | 1/1988 | Belisle et al. ............ 428/325 |
| 4,758,469 | 7/1988 | Lange ..................... 428/325 |
| 4,763,985 | 8/1988 | Bingham . |
| 4,772,511 | 9/1988 | Wood et al. ............. 428/325 |
| 4,897,136 | 1/1990 | Bailey et al. ............. 156/145 |
| 4,931,414 | 6/1990 | Wood et al. ............. 501/103 |
| 5,008,142 | 4/1991 | Wilson et al. ........... 428/203 |
| 5,064,272 | 11/1991 | Bailey et al. ............. 359/541 |
| 5,262,225 | 11/1993 | Wilson et al. ........... 428/203 |

FOREIGN PATENT DOCUMENTS

| | | | |
|---|---|---|---|
| 0 249 505 | 12/1987 | European Pat. Off. | .......... C09D 3/72 |
| WO 97/28470 | 8/1997 | WIPO | .......... G02B 5/128 |

OTHER PUBLICATIONS

Gupta et al., *Polymer International*, 35 (1994) 109 (no month).

*Primary Examiner*—James Phan
*Attorney, Agent, or Firm*—David R. Cleveland

[57] ABSTRACT

A retroreflective article utilizing a solventless bead bond composition wherein the bead bond composition includes a urethane/acrylate interpenetrating polymer network in which the urethane polymer is a thermoplastic and the acrylate component is a thermoset. The solventless bead bond is applied as a mixture of diisocyanates, diols, multifunctional acrylates and additives and thermally cured to a rubbery, thermoplastic solid. At this point the bead bond can be softened or molded with the application of heat or stored for a period of time without loss of thermoplasticity. Final retroreflective sheeting constructions which possess superior adhesion to acrylics, toughness and high retroreflectance are achieved by curing the multifunctional acrylates with radiation.

16 Claims, 1 Drawing Sheet

URETHANE/ACRYLATE BEAD BOND FOR RETROREFLECTIVE ARTICLES

TECHNICAL FIELD

The invention pertains to a retroreflective article that utilizes a solventless binder composition containing a urethane/acrylate interpenetrating polymer network in which the urethane polymer is a thermoplastic and the acrylate component is a thermoset.

BACKGROUND OF THE INVENTION

Early retroreflective sheeting had an exposed-lens construction, but its retroreflective light was blanked out when the lenticular surface of the exposed lenses was covered with water. This problem was answered by enclosed-lens retroreflective sheeting in which, as taught in U.S. Pat. No. 2,407,680 (Palmquist et al.), the lenses were embedded within the sheeting which had a flat, transparent cover film. This allowed incident light rays to be focused onto the specularly reflective layer irrespective of whether the front of the sheeting was wet or dry. In U.S. Pat. No. 3,190,178 (McKenzie '178) the same problem is solved in a different way, namely, by modifying retroreflective sheeting of the exposed-lens type wherein lenses are partially embedded in a binder layer. In McKenzie '178, the exposed lenses are protected by a cover film to which the binder layer is sealed along a network of interconnecting lines, thus forming a plurality of hermetically sealed cells within which the lenses are encapsulated and have an air interface. Such exposed-lens sheeting is called "encapsulated-lens retroreflective sheeting".

In the method taught in McKenzie '178 for making encapsulated-lens retroreflective sheeting: (1) substantially a monolayer of lenses, such as glass microspheres, is embedded into a carrier web to a depth not exceeding 50% of the diameter of each microsphere, (2) specularly reflecting material is deposited over the lens-bearing surface of the carrier web, (3) a solution of binder material is applied over the specularly reflective deposit, (4) after drying the binder, the carrier web is stripped off leaving the lenses partially embedded in the binder,(5) a cover film is laid over the exposed lenses, and (6) heat and pressure are applied along a network of interconnecting lines causing the binder material to soften and flow around the lenses into contact with the cover film, thus forming the aforementioned hermetically sealed cells. The binder material typically includes a white pigment such as $TiO_2$ to give the sheeting a whiter color as well as a cleaner color in any area to which another color has been applied by silk screening. The color of the sheeting as well as the adhesion to a top film is enhanced if the specularly reflective material, usually aluminum, between the lenses is carried away by the carrier web.

Early binder layers typically were composed of a high molecular weight linear thermoplastic acrylate and a pigment. In U.S. Pat. No. 4,025,159 (McGrath '159), the durability of the encapsulated-lens construction was improved by curing the binder after bonding the cover film and base sheet together. U.S. Pat. No. 4,653,854 (Miyata) discloses attaching pendent hydroxyl groups to the backbone of the acrylate polymers used for the bead bond. Incorporation of polyisocyanates into the formulation allowed for crosslinking of the binder through the formation of urethane linkages.

While these developments helped address issues related to product durability and manufacturing, they generally required large amounts of solvent for coating operations. Due to cost and environmental considerations, this is a drawback in the manufacture of retroreflective sheeting.

Efforts to implement solventless binder technology into the construction of cellular retroreflective sheeting generally consisted of dissolving a high molecular weight acrylate polymer in one or more reactive diluents and then coating the material warm. This technique, however, also has certain drawbacks, such as the requirement of chilling to low temperatures for bead stripping. Belisle et al., in U.S. Pat. No. 4,721,649 reported using a solventless, thermoformable two-component urethane as a polymeric binder layer for "embedded-lens" retroreflective sheeting. U.S. Pat. No. 4,897,136 (Bailey et al. '136) and U.S. Pat. No. 5,064,272 (Bailey et al. '272) report using a thermoplastic urethane or an olefinic polymer (i.e. ethylene methacrylic acid) to develop a solventless binder for flexible cellular retroreflective sheeting.

A solvent-based semi-interpenetrating polymer network composition for use in embedded lens retroreflective sheeting is described in U.S. Pat. No. 5,008,142 (Wilson et al.)

SUMMARY OF THE INVENTION

The present invention has addressed the above shortcomings by providing retroreflective elements supported by a polymeric binder layer without using a solvent for its production. The binder layer is thermoformable in the presence of radiation curable monomers at relatively low temperatures, affords a material with sufficient green strength to remove the optical elements from a support film, and possesses a long shelf life. Furthermore, the thermoformable solid can be irradiated in a cellular retroreflective sheeting to give excellent adhesion to the cover film, and toughness and thermal stability at elevated temperatures. In deference to industry usage, the binder will sometimes be referred to in this application as a "bead bond" composition or layer, although it should be understood that the optical elements need not be beads.

In a first aspect, the present invention provides, in brief summary, a retroreflective sheeting that includes retroreflective elements encapsulated in sealed cells, the elements being supported by a bead bond layer that contains a urethane/acrylate semi-interpenetrating polymer network.

Briefly summarizing, a second aspect of the present invention provides a method of preparing an encapsulated lens retroreflective sheeting including the steps of:

(a) discharging a bead bond composition onto a carrier web that contains retroreflective elements, the bead bond composition comprising a mixture of a prepolymer, a diol or diol equivalent, and one or more acrylate monomers;

(b) applying thermal energy to the bead bond composition, forming a thermoplastic bead bond layer comprising a polyurethane;

(c) stripping the carrier web from the retroreflective elements and thermoplastic bead bond layer;

(d) embossing the thermoplastic bead bond layer to a cover film, e.g., an acrylic cover film; and (e) subjecting the bead bond layer to a sufficient amount of radiation to cure the acrylate, thereby forming a semi-interpenetrating urethane/acrylate network.

Further aspects of the present invention include constructions such as signs and information plates that contain the retroreflective articles of the invention.

While the construction of cellular retroreflective sheeting is known, using solventless technologies such as urethane/ acrylate semi-interpenetrating polymer networks (semi-IPNs) to form the bead bond layer is new.

A number of major requirements that a bead bond material preferably should possess include: (1) a suitable coating viscosity (e.g., about 20,000 cps at 25° C.) in the uncured state, (2) adequate mechanical strength to remove the optical elements from the support carrier, and (3) thermoplasticity prior to and during the embossing step.

Preferred embodiments of the present invention meet the requirements listed above in addition to providing a realistic approach to removing solvent and providing a more damage tolerant material. Semi-IPNs are formed by either synthesizing a linear polymer in the presence of nonparticipating monomers and, in a second step, polymerizing the nonparticipating monomers or, dissolving a preformed linear polymer in a monomer and polymerizing the monomer. In either situation, the result is linear polymer entangled in a dissimilar polymer network. In the present invention, the linear component is a urethane and the network component is an acrylate. The urethane linear component of the semi-IPN can be polymerized to a "B-stage" (using, e.g., a thermal cure mechanism) to form a rubbery, thermoplastic solid, embossed to a polymeric cover film, and crosslinked (using a radiation curing mechanism) to form the acrylate network component.

DETAILED DESCRIPTION OF ILLUSTRATIVE EMBODIMENTS

Figure 1:
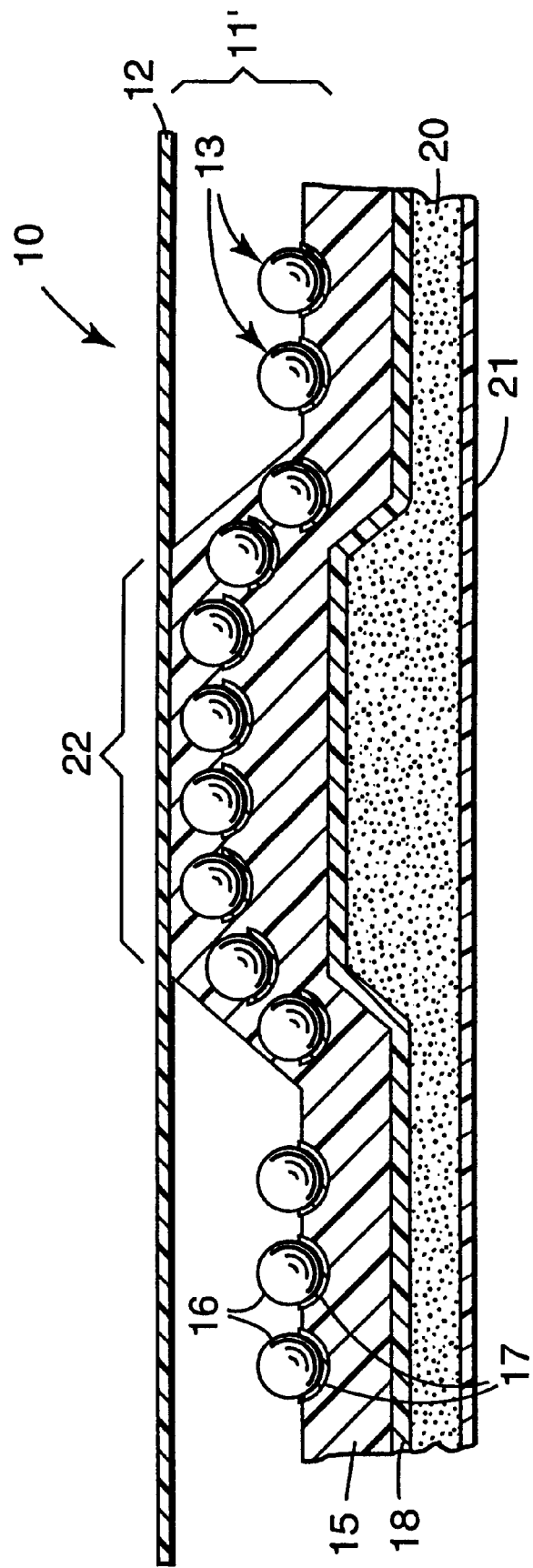
FIG. 1 is a cross-sectional representation of a portion of a cellular retroreflective sheeting.

As used herein, "Semi-interpenetrating polymer network" (semi-IPN) means a polymer network of two or more polymers that is formed by independent polymerization of two or more monomers so that the polymers are independent but are physically intertwined and are essentially free of chemical bonds between them and wherein at least one polymer is crosslinked, i.e., thermoset, and at least one is uncrosslinked, i.e., thermoplastic; there is produced an entangled combination of two polymers, one of which is crosslinked, that are not bonded to each other. Semi-IPNs may be prepared by methods known in art. See, for example, D. Klempner et al., Editors, *Interpenetrating Polymer Networks*, American Chemical Society (Washington, D.C., 1994); Sperling, L. H., *Interpenetrating Polymer Networks and Related Materials*, Plenum, (New York, 1981); and Gupta et al., *Polymer International*, 35 (1994) 109.

"Green strength" refers to the ability of the uncured bead bond layer to adhere to and remove retroreflective beads or elements from the bead carrier on which they are supplied.

All percentages referred to below are weight percentages unless otherwise specified.

The present invention provides a cellular retroreflective sheeting that uses a solventless bead bond layer and possesses many of the features exemplary of state of the art sheeting. The solventless bead bond is composed of a urethane/acrylate semi-IPN that can be manufactured using conventional mixing and curing equipment. Furthermore, the bead bond layer can be thermoformed and radiationcured to form hard tough coatings with excellent adhesion to polymeric cover films, e.g. poly-methyl-methacrylate films (PMMA). Cellular retroreflective sheeting formed using urethane/acrylate semi-interpenetrating polymer networks can be more damage tolerant due to the morphology obtained from semi-IPN's and the incorporation of a tough urethane component.

A cross-sectional view of cellular retroreflective sheeting 10 is depicted in FIG. 1 and includes a base sheet of retroreflective elements 13 embedded in a polymeric binder 15 (bead bond) and a polymeric cover film 12 disposed in spaced relation from the base sheet of retroreflective elements by a network of narrow intersecting bonds 22 that form hermetically sealed cells 11'. The retroreflective elements are typically constructed of glass beads 16 that have been coated to a depth of approximately one-half their diameter with a metallic vapor coat 17. The final construction may also include an optional liner 18, or an adhesive layer 20 and release liner 21 on the backside for application purposes which allows the sheeting to be adhered to a substrate such as a backing for a sign.

The urethane component preferably is derived from the reaction product of (a) a prepolymer derived from a mixture of a difunctional isocyanate and a polyol with (b) a diol or diol equivalent, and formed in the presence of radiation-curable acrylate monomers. The urethane polymer can be formed by thermally curing the bead bond components to provide a linear uncrosslinked polyurethane, without curing the radiation-curable acrylate monomers. For optimum results, precise stoichiometry of prepolymer and diol should be observed for the urethane polymer preparation. Nearly equimolar amounts of materials are preferably used in the prepolymer mixture. The resulting linear polyurethane preferably has a glass transition temperature, $T_g$ of about −20 to about 60° C.; more preferably about 0 to about 50° C.; and most preferably about 20 to about 40° C. The prepolymer preferably has a number average molecular weight ($M_n$) of about 500 to about 10,000 g/mole; more preferably about 500 to about 5,000 g/mole; and most preferably about 500 to about 3,000 g/mole; as measured using gel permeation chromatgraphy evaluated against a polystyrene standard.

The difunctional isocyanate component of the prepolymer may be any aliphatic, cycloaliphatic, aromatic or heterocyclic diisocyanate, or any combination of such diisocyanates. Particularly suitable diisocyanates correspond to the formula:

in which Q represents:

an aliphatic hydrocarbon radical containing from 2 to 100 carbon atoms and zero to 50 heteroatoms;

a cycloaliphatic hydrocarbon radical containing from 4 to 100 carbon atoms and zero to 50 heteroatoms;

an aromatic hydrocarbon radical or heterocyclic aromatic radical containing from 5 to 15 carbon atoms and zero to 10 heteroatoms; or an araliphatic hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorous.

Illustrative examples of suitable diisocyanates include ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate, 1-isocyanato-3,3,5-trimethyl-5-isocyanotomethylcyclohexane (isophorone diisocyanate, IDPI), 2,4- and 2,6-hexahydrotolylene diisocyanate, perhydro-2,4'- and -4,4'-diphenylmethane diisocyanate ($H_{12}MDI$), hexahydro-1,3- and -1,4-phenylene diisocyanate, 1,3- and -1,4-phenylene diisocyanate, 2,4- and 2,6-tolylene diisocyanate, diphenylmethane-2,4'- and -4,4'-diisocyanate, mixtures of 2,2,4- and 2,4,4-trimethyl hexamethylene diisocyanate (TMDI), naphthylene-1,5-diisocyanate, including mixtures of these isomers, as well as oligomers thereof, and any combination of the above diisocyanates.

Preferred are diisocyanates that are commercially available and which impart good processability to the urethane prepolymer. Illustrative examples of such diisocyanates include hexamethylene diisocyanate, methylene-bis-(4-cyclohexylisocyanate), isophorone diisocyanate, naphthalene 1,5-diisocyanate, toluene diisocyanate, isomers of diphenylmethane diisocyanate, or a mixture thereof. Isophorone diisocyanate is most preferred.

The polyol component of the present invention in the prepolymer mixture is preferably a liquid form, oligomeric difiunctional alcohol. The polyol preferably has a number average molecular weight ($M_n$) ranging from about 90 to about 5,000, more preferably about 90 to about 1,000 g/mole. Illustrative examples of suitable polyols include the Carbowax™ 400, 600, 800 and 1000 series of poly(ethylene oxide) compounds (available from Union Carbide Corp., Danbury, Conn.), caprolactone polyols such as the Tone™ 200, 201, 210, 230, 240 and 260 series of polyols (available from Union Carbide), poly(tetramethylene oxide) polyols such as the Poly THF™ 250, 650, 1000 and 2000 series of polyols (available from BASF Corp., Parsippany, N.J.), polypropylene oxide polyols, hydroxy-terminated polybutadiene materials, such as the Poly bd™ series of polyols (available from Elf Atochem, Philadelphia, Pa.), polycarbonate polyols, such as KM-10-1667™ and KM-10-1733™ polycarbonate diols (available from Stahl USA, Peabody, Mass.), polyurethane polyols, such as K-flex UD-320-100™ polyurethane diols (available from King Industries, Norwalk, Conn.), aromatic polyether polyols, such as Synfac 8024™ polyols (available from Milliken Chemical, Spartanburg, S.C.), and random copolymers of poly (tetramethylene oxide)polycarbonate, such as the Poly THF™ CD series of polyols (available from BASF Corporation, Mount Olive, N.J.). Polyester polyols include the Formrez™ family (available from Witco, Melrose Park, Ill.), such as Formrez™ 11–112, 22–55, 33–56, 44–58, 55–112 polyols or the Rucoflex™ family (RUCO Polymer Corporation, Hicksville, N.Y.) such as Rucoflex™ S-101, S-102, S-105, S-107, S-1014, S-1021, S-1028 and S-1034 diols. Polycaprolactone polyols, polycarbonate polyols, polyurethane diols and polyester polyols are preferred for weatherability reasons. Polycaprolactone polyols such as the Tone™ polycaprolactones available from Union Carbide are most preferred.

Other polyols suitable for use in the invention include the hydroxyalkyl ethers obtained by the addition of optionally substituted alkylene oxides, such as ethylene oxide, propylene oxide, butylene oxide and styrene oxide, onto the abovementioned polyols. Preferred examples of such hydroxyalkyl ether polyols include diethylene glycol, triethylene glycol, dipropylene glycol, tripropylene glycol, dibutylene glycol, 1,4-bis-(2-hydroxyethoxy)cyclohexane and 1,4-bis-(2-hydroxyethoxy-methyl)-cyclohexane, 1,4-bis-(2-hydroxyethoxy)-benzene. These materials have relatively low molecular weights and help incorporate rigidity into the urethane prepolymer backbone.

Preferably, the polyol is a diol and is present in an amount sufficient to provide an isocyanate-to-polyol (NCO:OH) molar ratio of reactants that is preferably between about 1.8:1 and about 2.2:1.

In addition to the above, a small amount (e.g. about 1 to 5 weight percent) of trifunctional or greater-functional isocyanates or polyols may, if desired, be added to the urethane prepolymer at a level which will not hamper the thermoformability of the bead bond.

The prepolymer or urethane precursors may also be obtained commercially. Particularly useful are the toluenediisocyanate polyether prepolymers PET-75D, -70D, -95A and PPT-95A or aliphatic-polyether prepolymers APC-722 and APC-1225 (available from Air Products and Chemicals, Inc., Allentown, Pa.). Other commercially available prepolymers suitable for use in the invention include aromatic polyurethanes such as PBA2280 and PBA2210 prepolymers (available from ICI, Wilmington, Del.) and Lupranate MP-102, -215 and WLIC 3236T prepolymers (available from BASF Corp., Parsippany, N.J.).

The urethane component is a reaction product of the above-mentioned prepolymer with a low molecular weight diol or diol equivalent, preferably a diol ranging in molecular weight ($M_n$) from 62 to about 350 g/mole. The diol provides the backbone rigidity to impart stiffness to the resulting urethane polymer. The urethane polymer can be prepared by combining the above-mentioned prepolymer precursors with the diol and acrylate and forming the urethane polymer in the presence of the unreacted acrylate, or the prepolymer can be formed separately and then combined with the diol and acrylate. If desired, the level of free isocyanate in the prepolymer can be reduced (e.g., by vacuum stripping) before addition of the diol and acrylate. After formation of the prepolymer, the free isocyanate monomer content of the urethane prepolymer preferably represents less than about 5 weight percent, more preferably less than about 2 weight percent, of the total weight of the urethane prepolymer.

Illustrative examples of preferred diols include ethylene glycol, 1,2- and 1,3-propane diol, 1,2-, 1,3-, 1,4-, and 2,3-butane diol, 1,5-pentane diol, 1,6-hexane diol, 1,8-octane diol, neopentyl glycol, 1,4-bis(hydroxymethyl) cyclohexane (1,4-cyclohexane dimethanol), 2-methyl-1,3-propane diol, dibromobutene diol, 2,2-dimethyl-1,3-propane diol, 1,6- and 2,5-hexane diol, 2,2,4- and 2,4,4-trimethyl-1, 6-hexane diol, cyclohexane-1,4-diol, 2,2-bis-(4-hydroxycyclohexyl)-propane, 1,4-bis(2-hydroxyethoxy)-benzene, 1,3-bis-hydroxyalkyl hydantoins, diethylene glycol, triethylene glycol, tetraethylene glycol, dipropylene glycol, and combinations thereof.

Another group of preferred diols includes hydroxyalkylated bisphenol derivatives. Preferred diols in this group have the following general formula:

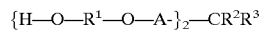

wherein $R^1$ is either a straight or branched or cyclic alkylene (e.g., methylene, ethylene, butylene, decylene) group consisting of 1 to 10 carbon atoms, or an aralkylene group consisting of 7 to 14 carbon atoms (e.g., benzylidene, 1,2-diphenylethylene, phenylethylene); $R^2$ and $R^3$ independently may be an alkyl group, aralkyl group, cycloalkyl group, alkaryl group, or an aryl group of from 1 to about 30 carbon atoms (preferably methyl, ethyl, and trifluoromethyl) and none or from 1 to about 10 heteroatoms, and $R^2$ and $R^3$ together can comprise an alkylene, cycloalkylene, arylene, alkarylene or aralkylene group containing from 2 to about 660 carbon atoms and none or from 1 to about 10 heteroatoms such as O and N. Specific preferred hydroxyalkylated bisphenol derivatives include 9,9-bis(4-hydroxyethoxyphenyl)fluorene (i.e., hydroxyethoxylated bisphenol of fluorenone), 2,2-bis-(4-hydroxyethoxyphenyl) butane (i.e., hydroxyethoxylated bisphenol of 2-butanone), 2,2-bis-(4-hydroxyethoxyphenyl)hexafluoropropane (i.e., hydroxyethoxylated bisphenol F), 2,2-bis-(4- hydroxyethoxyphenyl)propane, 2,2-bis-(4-hydroxyethoxyphenyl)norbornane, 2,2-bis-(4-hydroxyethoxyphenyl)-5,6-cyclopentanonorbornane, and 1,1-bis-(4-hydroxyethoxyphenyl)cyclohexane.

Still another group of preferred co-reactants in the urethane component includes so-called "diol equivalents" such as the difunctional aspartic esters sold commercially by Bayer, Pittsburgh, Pa., such as Desmophen™ PAC XP-7023, 7053, 7059 and 7068.

The above-described urethane component preferably is cured by thermal means as described hereafter. If desired, a catalyst may be employed in the composition to enhance the cure rate.

Catalysts for the reaction of polyisocyanates and active hydrogen-containing compounds are well-known in the art; see, for example, U.S. Pat. No. 4,495,061 (Mayer et al.). Preferred catalysts include organometallic compounds and amines. The organometallic compounds may be organotin compounds such as dimethyltin dilaurate, dibutyltin dilaurate, dibutyltin dimercaptide, dimethyltin dithioglycolate, and dioctyltin dithioglycolate. The amine catalysts preferably are tertiary amines such as triethylene diamine, dimorpholinodiethyl ether, and tris(dimethylamino ethyl)phenol. Generally, the catalyst is present in the reaction mixture at 0.02 to 0.30 weight percent, preferably 0.06 to 0.20 weight percent, and more preferably 0.07 to 0.15 weight percent.

The acrylate component includes mono- or multifunctional acrylate monomers that have a viscosity low enough to reduce the urethane prepolymer viscosity but have a molecular weight high enough so as not to impart brittleness to the final construction or not to impart volatility problems.

Classes of acrylates that can be used include acrylated epoxy resins, acrylated epoxidized soya and linseed oils, aromatic urethane acrylates, aliphatic urethane acrylates, polyester acrylates, silicone acrylates, acrylated acrylates, allyl acrylates, acrylated polybutadienes, acrylated melamines, and other aliphatic mono- and poly- functional acrylates.

Particular examples of useful acrylates include 2-ethylhexyl acrylate, octyldecyl acrylate, isodecyl acrylate, lauryl acrylate, stearyl acrylate, biphenyl acrylate, tridecyl methacrylate, 2-phenoxyethyl acrylate, ethoxylated phenoxyethyl acrylate, nonyl phenol ethoxylate monoacrylate, β-carboxyethyl acrylate, isobornyl acrylate, tetrahydrofurfuryl acrylate, tetrahydrofurfuryl methacrylate, 4-(butylcyclohexyl) acrylate, dicyclopentenyl acrylate, dicyclopentenyl oxyethyl acrylate, propylene glycol monoacrylate, propylene glycol monomethacrylate, 2-(2-ethoxyethoxy) ethyl acrylate, hydroxy ethyl acrylate, hydroxy propyl acrylate, hydroxy ethyl methacrylate, hydroxy propyl methacrylate, n-vinyl pyrrolidone, cyclohexyl acrylate, ethoxylated monoacrylate, monofunctional aromatic acrylate, ethoxylated aromatic acrylate, monofunctional aliphatic urethane acrylates, butanediol diacrylate, 1,3-butylene glycol dimethacrylate, hexanediol diacrylate, hexanediol dimethacrylate, neopentyl glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, dipropylene glycol diacrylate, tripropylene glycol diacrylate, ethoxylated neopentyl glycol diacrylate, propoxylated neopentyl glycol diacrylate, dianol diacrylate, dianol dimethacrylate, tetrabromo dianol diacrylate, trimethylolpropane triacrylate, pentaerythritol triacrylate, trimethylolpropane trimethacrylate, ethoxylated trimethylolpropane triacrylate, propoxylated trimethylolpropane triacrylate, propoxylated glycerol triacrylate, tris (2-hydroxyethyl) isocyanurate triacrylate, pentaerythritol tetraacrylate, dipentaerythritol pentaacrylate, dimethylolpropane tetraacrylate, alkoxylated tetraacrylate, highly alkoxylated tetraacrylates, trimethylolpropane diallyl ether, pentaerythritol triallyl acrylate and trimethylolpropane diallyl acrylate.

Preferred acrylates include tetraethylene glycol diacrylate, polyethylene glycol diacrylate, tripropylene glycol diacrylate, trimethylolpropane triacrylate, pentaerythritol triacrylate, tris(2-hydroxyethyl) isocyanurate triacrylate, pentaerythritol tetraacrylate, and dipentaerythritol tetraacrylate and pentaacrylate.

Other components may be added to the bead bond composition as desired or necessary. Examples of such additional components include pigments, dyes, antioxidants, hindered amine light stabilizers, ultraviolet light absorbers, flow control agents, plasticizers, elastomers, and other polymeric modifiers.

The urethane component preferably is present in the bead bond composition in amounts ranging from about 30 to about 90 weight percent, more preferably from about 60 to about 80 weight percent, and the acrylate radiation sensitive component preferably is present in amounts ranging from about 5 to about 60 weight percent, more preferably from about 10 to about 30 weight percent. For purposes of these calculations, the weight of the diol or diol equivalent is counted as part of the weight of the urethane component. A pigment is often included in the composition in amounts preferably ranging from about 5 to about 60 weight percent, more preferably about 10 to about 20 weight percent of the composition.

The compositions are useful as a bead bond or binder layer in preparing retroreflective sheetings, particularly encapsulated-lens type retroreflective sheeting. Such sheeting is known in the art and is discussed, for example, in McKenzie '178 and Bailey et al. '272.

The binder layer typically is a continuous, sheet-like layer that has a thickness of about 25 to 500 micrometers. Preferably, the thickness is about 75 to 125 micrometers. Thicknesses less than 25 micrometers may be too thin to adhere to both the substrate and the optical elements, and thicknesses greater than 500 micrometers may be too stiff and necessarily more expensive.

As indicated above, optical elements are supported by the binder layer to alter the direction of light. The optical elements can be microspheres that, preferably, are substantially spherical in shape in order to provide the most uniform and efficient retroreflection. The microspheres preferably also are substantially transparent so as to minimize absorption of light so that a large percentage of incident light is retroreflected. The term "transparent" is used herein to mean capable of transmitting light. The microspheres often are substantially colorless but may be tinted or colored in some other fashion. The microspheres may be made from glass, a non-vitreous ceramic composition, or a synthetic resin. In general, glass microspheres are preferred because they tend to be less expensive, harder, and more durable than microspheres made from synthetic resins. Examples of microspheres that may be usefull in this invention are disclosed in the following U.S. Pat. No. 1,175,224 (Bleeker '224), U.S. Pat. No. 2,461,011 (Taylor et al. '011), U.S. Pat. No. 2,726,161 (Beck et al. '161), U.S. Pat. No. 2,842,446 (Beck et al. '446), U.S. Pat. No. 2,853,393 (Beck et al. '393), U.S.

Pat. No. 2,870,030 (Stradley et al. '030), U.S. Pat. No. 2,939,797 (Rindone '797), U.S. Pat. No. 2,965,921 (Bland '921), U.S. Pat. No. 2,992,122 (Beck et al. '122), U.S. Pat. No. 3,468,681 (Jaupain '681), U.S. Pat. No. 3,946,130 (Tung et al. '130), U.S. Pat. No. 4,192,576 (Tung et al. '576), U.S. Pat. No. 4,367,919 (Tung et al. '919), U.S. Pat. No. 4,564,556 (Lange '556), U.S. Pat. No. 4,758,469 (Lange '469), U.S. Pat. No. 4,772,511 (Wood et al. '511), and U.S. Pat. No. 4,931,414 (Wood et al. '414). The disclosures of these patents are incorporated herein by reference.

The microspheres typically have an average diameter in the range of about 10 to 200 microns, preferably about 25 to 80 microns. Microspheres used in the present invention typically have a refractive index of about 1.91, although values in the range of about 1.5 to 2.5 may be useful as well, depending on the type of sheeting desired.

As mentioned above, optical elements used in this invention can have a specularly reflective metal reflective layer disposed beneath the embedded portions of the optical elements to provide a multitude of retroreflective elements. Preferably, the specularly reflective layer is disposed on the embedded or rear portions of the optical elements. The term "specularly reflective layer" is used herein to mean a layer comprising elemental metal which is capable of reflecting light, preferably specularly reflecting light. The metal may be a continuous coating produced by vacuum-deposition, vapor coating, chemical-deposition, or electroless plating. A variety of metals may be used to provide a specularly reflective layer. These include aluminum, silver, chromium, nickel, magnesium, and the like, in elemental form. Aluminum and silver are preferred metals for use in the specularly reflective layer. It is to be understood that in the case of aluminum, some of the metal may be in the form of the metal oxide and/or hydroxide. Aluminum and silver metals are preferred because they tend to provide good retroreflective brightness. The specularly reflective layer should be thick enough to reflect incoming light. Typically, the specularly reflective layer is about 50 to 150 nanometers thick. Although the reflective color of a silver coating can be brighter than an aluminum coating, an aluminum specularly reflective layer normally is preferred.

In lieu of a metal layer, a dielectric mirror may be used as a specularly reflective layer. The dielectric mirror may be similar to known dielectric mirrors disclosed in U.S. Pat. Nos. 3,700,305 and 4,763,985 to Bingham. The disclosures of these patents are incorporated herein by reference.

A cover film is employed to protect the sheeting material. This film is typically transparent and is made of a durable polymeric material, such as polycarbonate, polymethyl methacrylate, and the like.

An especially useful transparent cover film comprises polymethylmethacrylate (PMMA), which maintains its clarity and other properties very well under outdoor weathering conditions. Polycarbonate films are also useful, and especially where outdoor durability is not important, films such as polyethylene terephthalate, cellulose acetate, and cellulose acetate butyrate may be used. The cover films are typically between about 1 and 5 mils in thickness, though they may have other thicknesses also. In addition to thermoplastic cover films as described, cover films that will undergo reaction both internally and with the material of the bead bonds may be used.

In general, the sheeting material is prepared by embedding substantially a monolayer of retroreflective elements such as glass microspheres into a carrier web to a depth not exceeding 50% of the diameter of each microsphere; depositing specularly reflecting material over the retroreflective element-bearing surface of the carrier web; coating the bead bond composition of the invention over the specularly reflecting deposit; applying thermal energy to the bead bond composition to form a thermoplastic bead bond layer; stripping away the carrier web while leaving the retroreflective elements partially embedded in the bead bond layer; embossing a polymeric cover film to the retroreflective element side of the bead bond layer, and subjecting the bead bond layer to a sufficient amount of radiation to cure the acrylate thereby forming a semi-interpenetrating urethane/acrylate network.

If desired, the carrier web and its partially-embedded, vapor-coated retroreflective elements (e.g., beads) can optionally be coated with a release coating to aid in removal of the beads from the carrier web. Suitable release coatings include aqueous fatty acid solutions, the crystallizing composition described in copending U.S. patent application Ser. No. 08/832,878, filed Apr. 4, 1997 and assigned to the assignee of the present invention, and conventional water-borne or solvent-borne bead bond compositions such as the solvent-borne compositions described in McKenzie '178 and McGrath '159 (e.g., in Example 2). The use of such a release coating can help provide a better balance of process conditions and optical properties in the final article. For example, the intermediate coat can be used to improve strippability of the beads from the carrier web.

The bead bond composition is formed by combining the prepolymer mixture of (or the reaction product of) a diisocyanate and a polyol, with the diol or diol equivalent and the multi-functional acrylates, as well as pigments and additives, if desired. The bead bond composition can be discharged or coated onto the pretreated beaded support web. Alternatively, the bead bond composition may be thermally cured, then laminated onto the beads. This method is preferred when aluminum coated beads are used as reflecting materials. The thermal curing process for preparing the polyurethane is preferably carried out at temperatures of about 70 to about 120° C. The cure rate may also be accelerated by using a catalyst as above described, if desired.

Following stripping the carrier web, the bead bond composition may be embossed to a cover film, preferably an acrylic cover film and most preferably polymethylmethacrylate top film, and finally crosslinking the multi-functional acrylates with radiation. The resulting bead bond layers are relatively hard, tough thermosets which possess excellent adhesion to polymethylmethacrylate (preferably greater than about 0.4 Mpa), good dimensional stability (preferably at temperatures up to or exceeding 100° C.), tensile moduli preferably between about 400 and about 1400 MPa, elongation at break preferably between about 5 and about 200%, and stress at break preferably between about 14 and about 35 MPa.

The invention may be further understood by reference to the following examples, which are merely illustrative and not limiting of the invention. Unless otherwise indicated, all amounts are expressed as parts by weight.

EXAMPLES

Glossary of materials

The following materials are used in the following examples:

TINUVIN™ 292 hindered amine light stabilizer from Ciba-Geigy Corporation, Hawthorne, N.Y.;

TINUVIN™ 123 hindered amine light stabilizer from Ciba-Geigy Corporation;

DISLON™ 1970 defoamer from Ultra Additives Inc., Paterson, N.J.;

IPDI (isophorone diisocyanate) from Hüls Inc., Piscataway, N.J.;

TEGDA (tetraethyleneglycol diacrylate) from Sartomer Co., Exton, Pa.;

SYNFAC™ 8024 (ethoxylated Bisphenol A), from Milliken Chemicals, Spartanburg, S.C.

DBTDL (dibutyltin dilaurate), from Aldrich, Milwaukee, Wis.

TEST METHODS

Retroreflectivity Measurements

Retroreflectivity measurements for each of the following sheeting materials were obtained using a retroluminometer on 5 cm by 7 cm samples. The samples were adhered to an aluminum panel using a pressure sensitive adhesive and mounted in the plane of the first and second axes. The samples were illuminated at an entrance angle of −4 and 40° and retroreflectance measurements were collected at a 0.20 observation angle. The geometrical coordinates as defined in ASTM E808-81 were used to define axes and angles. The samples were oriented in the sample plane to achieve maximum retroreflectance. The data is reported in candelas per lux per square meter ($cd/lx/m^2$).

Z-Peel Test

The tensile bond Z-peel test is based on ASTM D 952-93. The specimen to be tested is attached between two metal fixtures. For the purposes of the following examples, the test was set up using an upper fixture that was a cubic block of aluminum 2.54 centimeters on each edge presenting a 6.5 $cm^2$ surface. The lower fixture was a 6.4 cm wide×19.6 cm long aluminum plate that was 1.6 mm thick.

For the test, a 6.5 $cm^2$ piece of the retroreflective sheeting of this invention was covered on the top with a layer of a suitable pressure sensitive tape such as SCOTCH™ Adhesive Tape No. 4930 (from 3M, St. Paul, Minn.), and on the bottom with a pressure sensitive adhesive such as SCOTCH™ Adhesive Tape No. 419 (3M). The sheeting was placed, back side down on the center of the aluminum plate and the metal block was placed on the top side of the sheeting. The assembled sandwich was then compressed with a force of 139 kilopascals (kPa) for 30 seconds. The aluminum cube was secured in the upper jaw of a standard tensile testing machine and the aluminum plate was secured along two sides in a lower gripping fixture of the tester. The jaws were rapidly separated at 30.5 cm/minute, the force versus displacement curve was recorded and the peak force was reported.

Example 1

A bead bond coating was formulated by combining 291.1 parts of an isocyanate-capped prepolymer prepared from IPDI and TONE™ 201 polycaprolactone polyol (Union Carbide Corp., Danbury, Conn.) in a 2.05:1 IPDI:polycaprolactone ratio; 5.9 parts TINUVIN™ 292; 1.5 parts DISLON™ 1970; and 53.0 parts TEGDA. The mixture was thoroughly agitated, degassed and placed in the larger barrel of a 400 mL, 2:1 mixing cartridge equipped with a 24 element static mixer. Similarly, a mixture of 108.5 parts SYNFAC™ 8024; 0.5 parts DBTDL; 32.5 parts TEGDA; and 1.5 parts DISLON™ 1970 was agitated, degassed and placed in the smaller barrel of the mixing cartridge. The cartridge was discharged onto a pretreated web containing aluminum-vapor-coated glass beds embedded in a temporary support film. The web was sent through a four zone oven at 1.83 m/min and a maximum temperature of 121° C. After passing over a chill roll, the web was laminated with 0.03 mm polyethylene terephthalate (PET) and wound on a core. The laminated sample displayed excellent strippability, thermoplasticity, aggressive wetting of PMMA and good shelf stability (>2 months). To complete the construction of cellular reflective sheeting, the bead bond was stripped from the support film, thermoformed to 0.08 mm PMMA cover film at 149° C. and e-beamed at 3 megarads (200,000 electron-volts, 15.2 m/min). The resulting construction possessed good Z-Peel adhesion to the cover film (0.7 megapascals±0.03 MPa), good flexibility, controlled tear (tearing only at the lamination lines, not through cells) and good retroreflectance of 320 at an entrance angle of −4° and 177 at 40° (units in $cd/lx/m^2$, 0.2° observation angle).

Example 2

A series of bead bond coatings having increasing levels of tin catalyst (DBTDL) was formulated using the components in Example 1 and TINUVIN™ 123 stabilizer instead of TINUVIN™ 292 stabilizer. The processing conditions outlined in Example 1 were used to form the cellular reflective sheeting. All of the films stripped from the support film after the thermal cure, and could be heat sealed and crosslinked upon irradiation with e-beam. Pertinent properties of the sheeting are shown in Table 1.

TABLE 1

Properties of Cellular Retroreflective Sheeting Made According to Example 2

| Wt % Catalyst | Z-Peel Force (kPa) | Retroreflectance ($cd/lx/m^2$) | |
| --- | --- | --- | --- |
| | | −4° | 40° |
| 400 ppm | 700 ± 40 | 326 | 169 |
| 600 ppm | 680 ± 130 | 308 | 161 |
| 800 ppm | 780 ± 80 | 314 | 172 |
| 1000 ppm | 760 ± 40 | 310 | 195 |

While the invention has been described with reference to preferred embodiments, it will be understood by those skilled in the art that various changes may be made and equivalents may be substituted for elements thereof without departing from the scope of the invention defined by the following claims.

What is claimed is:

1. A retroreflective article comprising retroreflective elements encapsulated in sealed cells, the elements being supported by a bead bond layer that comprises a urethane/acrylate semi-interpenetrating polymer network.

2. The article of claim 1 wherein the urethane has a $T_g$ of about −20 to +60° C.

3. The article of claim 1 wherein the urethane comprises the reaction product of a prepolymer and a diol or diol equivalent.

4. The article of claim 3 wherein the prepolymer comprises the reaction product of a difunctional isocyanate and a polyol.

5. The article of claim 4 wherein the difunctional isocyanate comprises hexamethylene diisocyanate, methylene-bis-(4-cyclohexyl isocyanate), isophorone diisocyanate, naphthalene 1,5-diisocyanate, toluene diisocyanate, isomers of diphenylmethane diisocyanate or a mixture thereof.

6. The article of claim 4 wherein the polyol has a number average molecular weight ($M_n$) of about 200 to 5000.

7. The article of claim 4 wherein the polyol comprises a polycaprolactone, polyurethane, polycarbonate, polyester, or a mixture thereof.

8. The article of claim 3 wherein the prepolymer has a number average molecular weight ($M_n$) of about 500 to about 10,000.

9. The article of claim 3 wherein the diol has a molecular weight ($M_n$) of 62 to about 350.

10. The article of claim 3 wherein the diol comprises butanediol, 2methyl-1,3-propanediol, cyclohexane dimethanol, cyclohexane-1,4-diol, 1,4-bis-hydroxy ethoxybenzene, ethoxylated bisphenol-A, ethoxylated bisphenol-F, polycarbonate diol, 1,3-bis-hydroxyalkyl hydantoin, aspartic ester, or a mixture thereof.

11. The article of claim 1 wherein the acrylate comprises an acrylated epoxy resin, a polyester acrylate, a urethane acrylate, a silicone acrylate, an acrylated acrylate, an allyl acrylate, an aliphatic mono- or poly- acrylate, or a mixture thereof.

12. The article of claim 1 wherein the acrylate comprises polyethylene glycol diacrylate, 2-(2-ethoxyethoxy)ethyl acrylate, trimethylolpropane triacrylate, tris-(2-hydroxyethyl) isocyanurate triacrylate, tetraethylene glycol diacrylate, tripropylene glycol diacrylate, pentaerythritol tetraacrylate, dipentaerythritol pentaacrylate, or a mixture thereof.

13. The article of claim 1 wherein the bead bond layer comprises about 60 to 80 weight percent urethane, about 10 to 30 weight percent acrylate, and about 10 to 20 weight percent pigment.

14. The article of claim 1 wherein the urethane comprises the reaction product of an isophorone diisocyanate end-capped polycaprolactone and ethoxylated bisphenol-A.

15. The article of claim 1 wherein the acrylate comprises tetraethylene glycol diacrylate, tripropylene glycol diacrylate, tris-(2-hydroxyethyl) isocyanurate triacrylate, or a mixture thereof.

16. The article of claim 1 wherein the acrylate comprises tetraethylene glycol diacrylate.

* * * * *

UNITED STATES PATENT AND TRADEMARK OFFICE
CERTIFICATE OF CORRECTION

PATENT NO.   : 5,959,775
DATED        : September 28, 1999
INVENTOR(S)  : William D. Joseph and Lee A. Pavelka It is certified that error appears in the above-identified patent and that said Letters Patent is hereby corrected as shown below:

Column 5,
Line 15, "difiunctional" should read -- difunctional --.

Column 7,
Line 2, "norbomane" should read -- norbornane --.

Column 8,
Line 63, "usefull" should read -- useful --.

Column 12,
Line 54, after "interpenetrating", please insert -- polymer --.

Signed and Sealed this

Twenty-seventh Day of November, 2001

*Attest:*

NICHOLAS P. GODICI
*Attesting Officer*    *Acting Director of the United States Patent and Trademark Office*